United States Patent [19]
Duffy et al.

[11] Patent Number: 5,339,393
[45] Date of Patent: Aug. 16, 1994

[54] GRAPHICAL USER INTERFACE FOR DISPLAYING AVAILABLE SOURCE MATERIAL FOR EDITING

[75] Inventors: Robert Duffy, Milpitas; O. F. Morgan, San Jose, both of Calif.

[73] Assignee: Sony Electronics, Inc., Park Ridge, N.J.

[21] Appl. No.: 47,825

[22] Filed: Apr. 15, 1993

[51] Int. Cl.5 .............................................. G06F 15/40
[52] U.S. Cl. .................................. 395/161; 395/154; 360/14.1; 360/14.2
[58] Field of Search ............... 395/154, 155, 157, 161; 358/311, 335, 141, 142; 360/14.1, 14.0, 14.2

[56] References Cited

U.S. PATENT DOCUMENTS

| | | | |
|---|---|---|---|
| 3,364,306 | 1/1968 | Brown . | |
| 3,991,265 | 11/1976 | Fukuda et al. | 358/143 X |
| 4,161,001 | 7/1979 | Sakamoto | 60/10.3 X |
| 4,283,745 | 8/1981 | Kuper et al. | 360/13 |
| 4,394,745 | 7/1983 | Menezes et al. | 360/14.1 X |
| 4,428,001 | 1/1984 | Yamamura et al. | 358/335 X |
| 4,533,910 | 8/1985 | Sukonick et al. | 340/721 |
| 4,538,188 | 8/1985 | Barker et al. | 360/14.3 |
| 4,549,173 | 10/1985 | Nakamura | 360/10.3 X |
| 4,555,775 | 11/1985 | Pike | 364/900 |
| 4,622,545 | 11/1986 | Atkinson | 340/747 |
| 4,685,003 | 8/1987 | Westland | 360/14.1 X |
| Re. 32,632 | 3/1988 | Atkinson | 340/709 |
| 4,729,044 | 3/1988 | Kiesel | 360/14.3 |
| 4,748,618 | 5/1988 | Brown et al. | 370/94 |
| 4,777,882 | 9/1988 | Mical | 340/709 |
| 4,785,408 | 11/1988 | Britton et al. | 364/513.5 |
| 4,812,834 | 3/1989 | Wells | 340/721 |
| 4,837,638 | 6/1989 | Fullwood | 360/14.2 X |
| 4,847,604 | 7/1989 | Doyle | 340/706 |
| 4,884,223 | 11/1989 | Ingle et al. | 364/550 |
| 4,899,136 | 2/1990 | Beard et al. | 340/706 |
| 4,914,732 | 4/1990 | Henderson et al. | 340/825 |
| 4,931,783 | 6/1990 | Atkinson | 340/710 |
| 4,935,865 | 6/1990 | Rowe et al. | 364/188 |
| 4,937,685 | 6/1990 | Barker et al. | 360/14.1 |
| 4,939,507 | 7/1990 | Beard et al. | 340/706 |

(List continued on next page.)

FOREIGN PATENT DOCUMENTS

| | | |
|---|---|---|
| 0239884 | 10/1987 | European Pat. Off. . |
| 55-75380 | 6/1980 | Japan . |
| 56-154885 | 11/1981 | Japan . |

OTHER PUBLICATIONS

Alexander, Visualizing cleared-off desktops, *Computerworld*, May 6, 1991, p. 20.

(List continued on next page.)

*Primary Examiner*—Heather R. Herndon
*Assistant Examiner*—Cliff Nguyen Vo
*Attorney, Agent, or Firm*—Irell & Manella

[57] ABSTRACT

A computer editing system graphical user interface includes at least one central processing unit (CPU) coupled through appropriate input/output (I/O) circuitry to input devices, such as a cursor control device, and a display device. The CPU is further coupled to a storage device for the storage of data and programs including a database. The database comprises a plurality of source logs indicating a beginning point and an ending point defining all the available source material for the corresponding source log. An output sequence of selected source material is displayed on a timeline as source material blocks, wherein the source material blocks are defined by a head point and a tail point. Through the computer editing system, a user performs a variety of re-editing functions to trim existing source material and to insert new source material on the timeline. When performing a re-edit function, all available source material blocks for a source log selected for re-edit is displayed. The selected source block displayed is visually distinguished by size, color and relative layering. By distinguishing the selected source block for which re-edit is desired, the user is permitted to clearly view all the available source material for the selected source block.

26 Claims, 7 Drawing Sheets

U.S. PATENT DOCUMENTS

| | | | |
|---|---|---|---|
| 4,939,594 | 7/1990 | Moxon et al. | 360/14.1 |
| 4,943,866 | 7/1990 | Barker et al. | 395/161 X |
| 4,945,425 | 7/1990 | Hahn | 360/14.1 X |
| 4,949,193 | 8/1990 | Kiesel | 360/14.1 X |
| 4,964,004 | 10/1990 | Barker et al. | 360/14.1 X |
| 4,979,050 | 12/1990 | Westland et al. | 360/14.1 |
| 5,008,853 | 4/1991 | Bly et al. | 364/900 |
| 5,012,334 | 4/1991 | Etra | 360/14.1 X |
| 5,023,727 | 6/1991 | Boyd et al. | 360/14.1 X |
| 5,062,060 | 10/1991 | Kolnic . | |
| 5,072,412 | 12/1991 | Henderson, Jr. et al. | 395/159 |
| 5,155,806 | 10/1992 | Hoeber et al. | 395/157 |
| 5,157,768 | 10/1992 | Hoeber et al. | 395/157 |
| 5,202,961 | 4/1993 | Mills et al. | 395/161 X |
| 5,237,648 | 8/1993 | Mills et al. | 395/153 X |

OTHER PUBLICATIONS

Hiroshi Ishii, Kazuho Arita, Clearface: Translucent Multiuser Interface for TeamWorkStation, *ECSCW*, Sep., 1991, pp. 6–10.

Hiroshi Ishii, Naomi Miyaka, Toward an Open Shared Workspace, *Communications of the ACM*, Dec. 1991, vol. 34, No. 12, pp. 37–50.

Article entitled: Learning Considerations in User Interface Design: The Room Model; author: Patrick P. Chan; publication of the Software Portability Laboratory, University of Waterloo, Waterloo, Ontario, Canada, Jul. 1984.

Article entitled: Creation/Modification of the Audio Signal Processor Setup For A PC Audio Editor; publication of International Business Machines, IBM Technical Disclosure Bulletin, vol. 30, No. 10, Mar. 1988.

Article entitled: Browsing Within Time–Driven Multimedia Documents; authors; Stavros Christodoulakis and Steven Graham; publication of the Institute for Computer Research, University of Waterloo, Waterloo, Ontario, Canada, Jul, 1988.

Article entitled: Impact: An Interactive Natural–Motion–Picture Dedicated Multi–Media Authoring System; authors: Hirotada Ueda, Takafumi Mityatake, and Satoshi Yoshizawa, Communications of the ACM, Mar. 1991, pp. 343–350.

Leanne Ryan, "Editing the Montage Way", pp. 164–165 *On Location*, Jun. 1984.

GRAPHICAL USER INTERFACE FOR DISPLAYING AVAILABLE SOURCE MATERIAL FOR EDITING

BACKGROUND OF THE INVENTION

1. Field of the Invention

The present invention relates to apparatus and methods for displaying graphic information, and more particularly, the present invention relates to a computer controlled display system for editing a multi-media production.

2. Art Background

Over the past decade, a variety of graphic user interfaces have been developed to ease human interaction with computer systems. Many display systems utilize metaphors in the design of the interface as a way of maximizing human familiarity, and conveying information between the user and the computer. It is common for computer systems incorporating so-called "object oriented" display systems to utilize multiple "windows" on a display in which combinations of text and graphics are disposed. The display systems utilize familiar metaphors, such as desktops, control panels, notebooks and the like, such that the interface takes advantage of existing human mental structures to permit a user to draw upon the metaphor analogy to understand the requirements of the particular computer system.

It is well known that designing around a familiar metaphor helps reduce human learning time. (See for example, Patrick Chan, "*Learning Considerations in User Interface Design*: The Room Model", Report CS-84-16, University of Waterloo Computer Science Department, Ontario, Canada, July, 1984, and the references cited therein.) The ability to operate on images or objects which relate the user to actual objects on, for example, a desktop, results in a stronger man-machine interface. (See for example, D. Robson, "*Object Oriented Software Systems*", BYTE, August 1991, page 74, Vol. 6, No. 8; L. Tesler, "*The Smalltalk Environment*", BYTE, August 1981, page 90, Vol. 6, No. 8; and Smith, et al., "*Star User Interface*: An Overview", National Computer Conference, 1982.

Research in interface design using metaphors in man-machine interfaces may be applied to computer controlled editing systems to incorporate and integrate various production media resources, such as special effects, music, graphics and the like. In the case of an editing system, a variety of resources must be integrated, scheduled and coordinated with one another to obtain a complete multi-media product. Users of computer controlled editing systems are generally familiar with the individual resources and the coordination of those resources to develop a finished product. Accordingly, the "windows" utilized in a video editing system may be designed such that the metaphor of the interface takes advantage of the knowledge of the user in operating discrete devices (for example, a video tape recorder or music synthesizer). The window may, therefore, take the form of a control panel for the video tape recorder, which includes the controls of play, reverse, record and the like. Similarly, the window may provide an area on the display screen in which movies, takes, or particular scenes are displayed for the user to edit.

A computer controlled editing system may allow a user of the system to integrate source material from a variety of multi-media resources to generate an output sequence. One problem associated with computer editing systems is that the editing systems often fail to provide the user an organized and visual display of the source material available to create the output sequence. Without a visual display of the source material, it is difficult for a user to select source material for editing or re-editing of an output sequence. As will be described, the present invention provides methods and apparatus for viewing available source material for executing re-edit functions.

SUMMARY OF THE INVENTION

The present invention provides apparatus and methods for use in computer display systems, and in particular, a graphical user interface for use in computer controlled multi-media editing systems. A display system including at least one central processing unit (CPU) is coupled through appropriate input/output (I/O) circuitry to input devices, such as a cursor control device. The CPU is further coupled to a storage device for the storage of data and programs including a database. The CPU is also coupled to a display device on which the present invention's user interface is displayed. The database comprises a plurality of source logs which are pointers to selected portions of audio and/or video source material located on various media resources. Through use of the source logs, the computer editing system controls the various media resources to provide source material for editing or re-editing of a production.

The computer controlled editing system of the present invention generates an output sequence of selected source material displayed on a timeline. The source logs contain a beginning point and an ending point defining all the available source material for the corresponding source log. To generate the output sequence on the timeline, a portion of a source log is selected by defining a head point and a tail point. The computer controlled editing system of the present invention permits a user to perform a variety of re-editing functions to trim existing source material and to insert new source material on the timeline. When performing a re-edit function, the computer controlled editing system displays all available source material for a source log selected for re-edit. To accomplish this task, a source material block displayed is visually distinguished by size, color and relative layering. By distinguishing the selected source block for which re-edit is desired, the user is permitted to clearly view all the available source material for the selected source log.

BRIEF DESCRIPTION OF THE DRAWINGS

The objects features and advantages of the present invention will be apparent from the following detailed description of the preferred embodiment of the invention with references to the drawings in which.

NOTATION AND NOMENCLATURE

Figure 1:
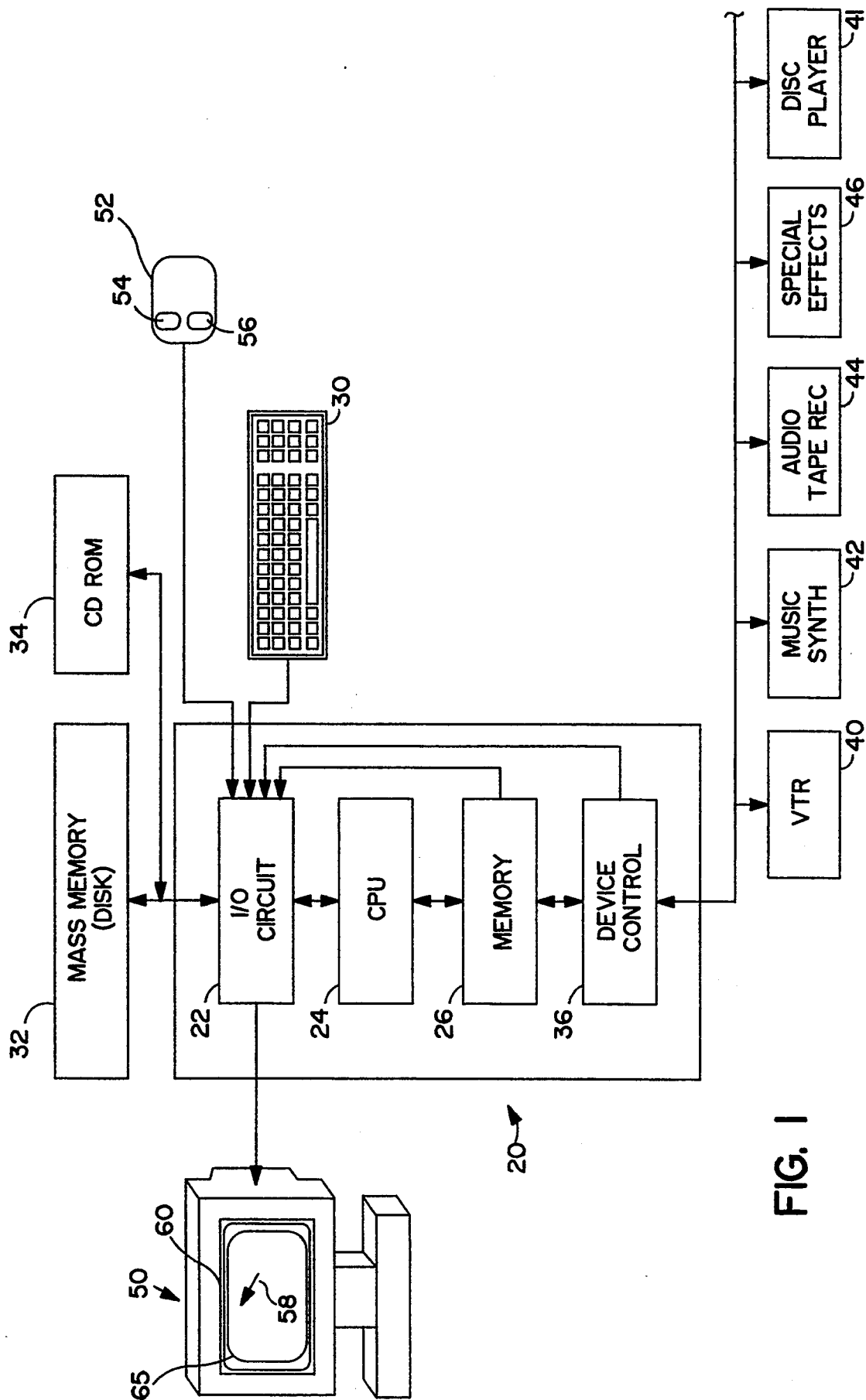
FIG. 1 is a functional block diagram illustrating one possible computer display system incorporating the teachings of the present invention.

The detailed descriptions which follow are presented largely in terms of display images, algorithms, and symbolic representations of operations of data bits within a computer memory. These algorithmic descriptions and representations are the means used by those skilled in the data processing arts to most effectively convey the substance of their work to others skilled in the art.

An algorithm is here, and generally, conceived to be a self consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, images, terms, numbers, or the like. It should be borne in mind, however, that all of these and similar terms are to be associated with the appropriate physical quantities and are merely convenient labels applied to these quantities.

In the present case, the operations are machine operations performed in conjunction with a human operator. Useful machines for performing the operations of the present invention include general purpose digital computers or other similar devices. In all cases, there should be borne in mind the distinction between the method operations of operating a computer and the method of computation itself. The present invention relates to method steps for operating a computer and processing electrical or other physical signals to generate other desired physical signals.

The present invention also relates to apparatus for performing these operations. This apparatus may be specially constructed for the required purposes, or it may comprise a general purpose computer selectively activated or reconfigured by a computer program stored in the computer. The algorithms, methods and apparatus presented herein are not inherently related to any particular computer. In particular, various general purpose machines may be used with programs in accordance with the teachings herein, or it may prove more convenient to construct more specialized apparatus to perform the required method steps. The required structure for a variety of these machines will appear from the description given below. Machines which may perform the functions of the present invention include those manufactured by Sony Corporation of America, as well as other manufacturers of computer systems.

DETAILED DESCRIPTION OF THE INVENTION

The present invention discloses apparatus and methods for visually displaying time based multiple track interrelationships and available graphical user interface on a computer display. In the following description, numerous specific details are set forth such as computer system configurations, window elements, icons, desktop sizes, metaphors, window configurations and arrangements, etc. in order to provide a through understanding of the present invention. However, it will be apparent to one skilled in the art that the present invention may be practiced without these specific details. In other instances, well known circuits, structures and the like are not described in detail so as not to obscure the present invention unnecessarily.

Referring to FIG. 1, the hardware configuration of the present invention is conceptually illustrated. FIG. 1 illustrates a computer editing system for generating a window-based graphic user interface in accordance with the teachings of the present invention. As illustrated, the computer editing system includes a computer 20 which comprises four major components. The first of these is an input/output (I/O) circuit 22, which is used to communicate information in appropriately structured form to and from other portions of the computer 20. In addition, computer 20 includes a central processing unit (CPU) 24 coupled to the I/O circuit 22 and to a memory 26. These elements are those typically found in most computers and, in fact, computer 20 is intended to be representative of a broad category of data processing devices.

Also shown in FIG. 1 is a keyboard 30 for inputting data and commands into computer 20 through the I/O circuit 22, as is well known. Similarly, a CD ROM 34 is coupled to the I/O circuit 22 for providing additional programming capacity to the system illustrated in FIG. 1. It will be appreciated that additional devices may be coupled to the computer 20 for storing data, such as magnetic tape drives, buffer memory devices, and the like. A device control 36 is coupled to both the memory 26 and the I/O circuit 22, to permit the computer 20 to communicate with multi-media system resources. The device control 36 controls operation of the multi-media resources to interface the multi-media resources to the computer 20. For example, in a video editing environment, the computer 20 may be coupled through the device control 36 to a video tape recorder 40, a music synthesizer 42, an audio tape recorder 44, a special effects resource 46, and a disc player 41 as shown. The device control 36 may comprise an independent control and interface device or a software process for execution by the CPU 24.

A display monitor 50 is coupled to the computer 20 through the I/O circuit 22. Any well known variety of cathode ray tube (CRT), liquid crystal or other displays may be utilized as display monitor 50. A cursor control device 52 includes switches 54 and 56 for signally the CPU 24 in accordance with the teachings of the present invention. Cursor control device 52 (commonly referred to a "mouse") permits a user to select various command modes, modify graphic data, and input other data utilizing switches 56 and 54. More particularly, the cursor control device 52 permits a user to selectively position a cursor 58 at any desired location on a display screen 60 of the display 50. As illustrated in FIG. 1, the cursor 58 is disposed with a window 65 in the present invention's graphic user interface, to be described more fully below. Moreover, in the presently preferred embodiment, the present invention's window-based user interface is generated and displayed using software stored in either memories 26, 32 or CD ROM 34, and executed by the CPU 24.

In the presently preferred embodiment, the cursor control 52 utilizes well known apparatus and methods for signaling CPU 24 of position changes of cursor 58 by movement of the cursor control over a surface. However, it will be appreciated by one skilled in the art that a variety of well known cursor control devices may be utilized by the present invention, including other control devices such as mechanical mice, trackballs, joy sticks, graphic tablets, other keyboard inputs and the like. The cursor control 52 in FIG. 1 is intended to encompass all such equivalent devices.

The graphical user interface of present invention displays information for re-editing associated with a database. Typically, the database is generated from a computer controlled editing system to incorporate and integrate various production media resources. As an example, a computer controlled editing system configured in accordance with the present invention may provide a means for a user of the computer controlled editing system to generate source logs. The database comprises a plurality of source logs which are pointers to selected portions of audio and/or video source material located on various media resources. Each source log comprises information such as a tape identifier, an start point, and end point, and any other information useful for the editing and re-editing processes. The database also contains a total duration for each source log. Through use of the source logs, the computer editing system controls the various media resources to provide source material for editing or re-editing of a production. For example, to create a source log, a user may select a media resource, such as a video tape player, and command the computer controlled editing system to capture a selected portion of the video generated by the video tape player.

The source log generated may comprise video and/or any number of audio channels. The plurality of source logs generated for editing of a particular multimedia production may be arranged into a file such that the file contains source logs for the editing or re-editing of that particular production. As will be described more fully below, the graphical user interface of the present invention operates in conjunction with the database comprising the source logs. Although the present invention is described in conjunction with a computer controlled editing system that generates source logs, any database comprising source material for use in a computer controlled editing system could be used in accordance with the teachings of the present invention.

In a preferred embodiment, the computer editing system of the present invention retrieves the source logs stored in the database during an earlier edit session, and displays a corresponding source material block. Each source block contains a start point and an end point. The start and the end points define the available source material for the particular source block. To generate an output sequence, the source blocks are entered onto a timeline in a sequential order. However, in generating the output sequence, it may be desirable to include only a portion of the available source material from a particular source block. Therefore, the computer editing system permits selection of portions of any particular source block. The beginning of the selected portion of the source block is defined as the "in" or "head" point, and the closing of the selected portion of the source block is defined as the "out" or "tail" point. A final output sequence generated on the timeline comprises selected portions arranged such that a tail of a first source block is adjacent to a head of a subsequent source block.

Figure 2:
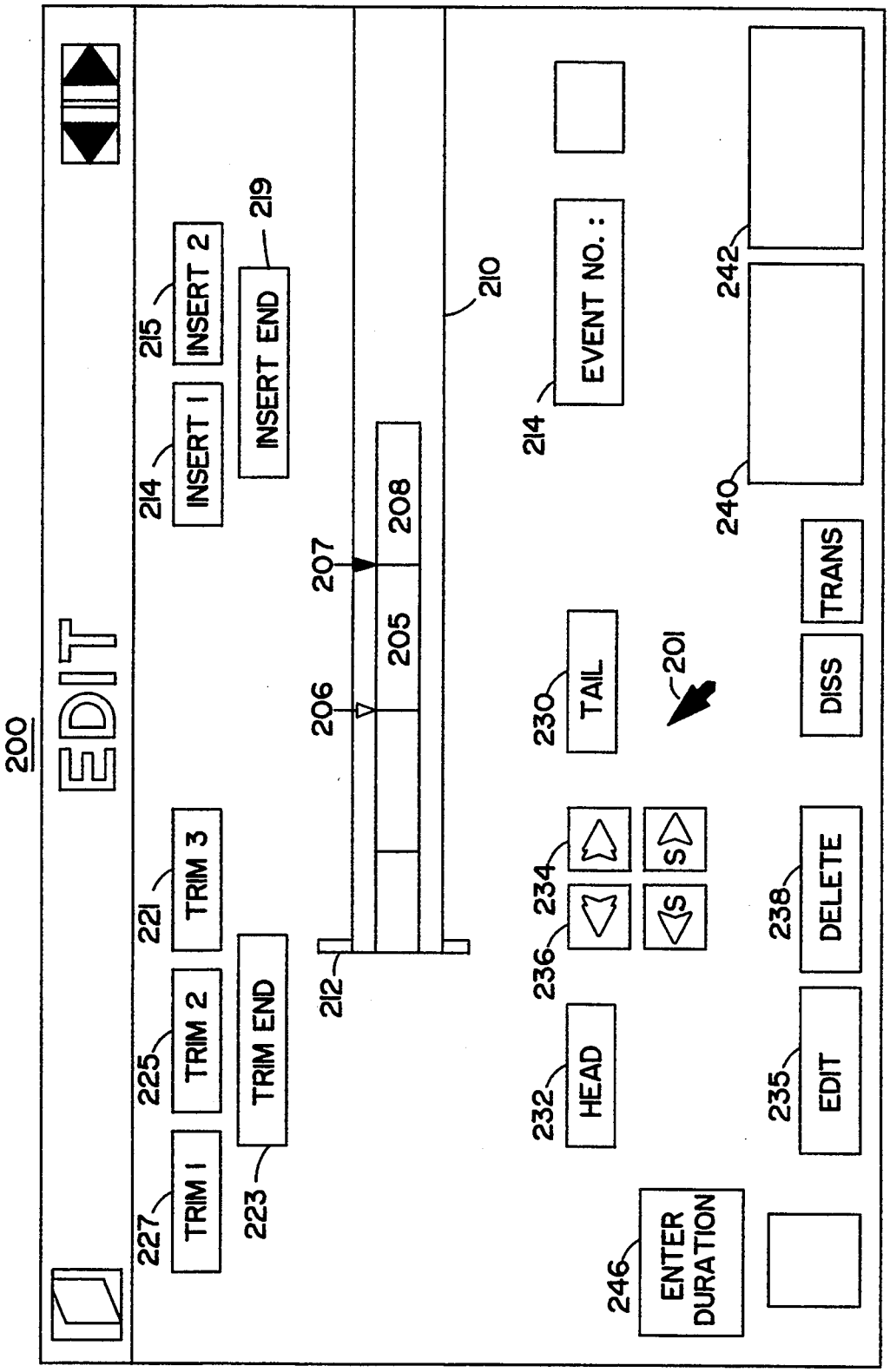
FIG. 2 illustrates a graphical user interface for a computer editing system configured in accordance with the present invention.

Referring to FIG. 2, a graphical user interface for a computer editing system configured in accordance with the present invention is illustrated. The graphical user interface 200 permits a user of the computer editing system to perform a number of re-editing functions. In general, the graphical user interface 200 contains at least one timeline 210, wherein the timeline 210 displays any number of source blocks arranged in a sequence. As described above, during an earlier editing session, source blocks are placed on each timeline which represents a time position in a final output sequence. Although a single timeline illustrated in FIG. 2, any number of timelines representing multiple tracks could be displayed in accordance with the teachings of the present invention. In a preferred embodiment, the multiple timelines representing time sequences for multiple tracks comprises one track of video and two tracks of audio. The timeline 210 is arranged in a horizontal direction beginning at the left and extending to the right. However, the timeline may be arranged in a horizontal direction beginning at the right and extending to the left, or the timeline may be arranged in a vertical direction.

In addition to the timeline 210, the graphical user interface 200 displays a timeline cursor 212 and a selection cursor 201. The timeline cursor 212 is used in the re-editing functions as is described more fully below. The placement of the selection cursor 201 on the graphical user interface 200 is controlled by the cursor control device 52. The graphical user interface 200 permits selection of a number of re-edit functions. Specifically, the present invention provides for three trim functions and two insert functions. The three trim functions are selectable from Trim 1 select 227, Trim 2 select 225, and Trim 3 select 221. The two insert functions are selectable by Insert 1 214 and Insert 2 215. The trim and the insert functions of the present invention may be selectable through any means. The trim and insert re-edit functions of the present invention are described more fully below.

The graphical user interface 200 provides for control and operation for the re-edit functions. An edit control 235 permits entry of source blocks on the timeline 210, and a delete control 238 allows deletion of a source block from the timeline 210. A head and tail control 232 and 230, respectively, control placement of the timeline cursor 212 and source blocks onto the timeline 210. The placement of the timeline cursor 212 at either the head or tail of a respective source block can be achieved through selection of either head 232 or tail 230, respectively. If the user selects the head control 232, then the computer editing system performs re-edit functions on the head portion of an adjacent source block. Alternatively, if the user selects the tail control 230, then the computer editing system performs re-edit functions on the tail portion of an adjacent source block.

In addition to controlling the placement of the timeline cursor 212 by the head and tail functions 232 and 230, a right arrow 234 and left arrow 236 move the cursor in the right and left directions, respectively. The timeline cursor is controlled by selection of right and left arrows 234 and 236 in any increment desired. For example, if source blocks displayed on a timeline identify frames of video, then selection of the right or left arrow 234 and 236 results in movement of one video frame. Also shown in FIG. 2 is an event number 214 and an enter duration 246. The event number 214 identifies the origin of a particular source block, and the entire duration displays the available length of a particular source block. In a preferred embodiment of the present invention, the graphical user interface 200 is viewed in conjunction with an additional display. The additional display permits viewing of the source material simultaneously with display of corresponding source blocks on the graphical user interface 200. Although a graphical user interface is illustrated for control and operation of a number of re-editing functions, any control interface could be used to manipulate and control the re-edit functions the present invention without deviating from the spirit and scope of the invention.

Figure 3A:
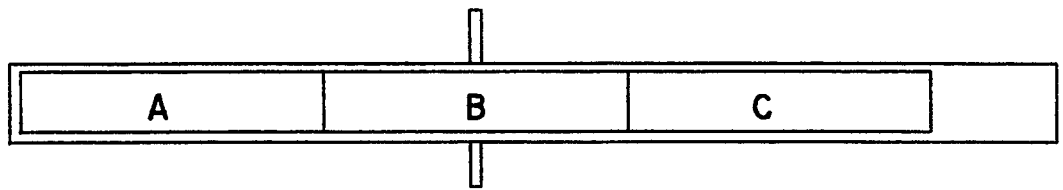
FIGS. 3a–e illustrate a graphical user interface for a re-edit insert function configured in accordance with the present invention.

Referring to FIGS. 3a-e, a graphical user interface for a re-edit insert function configured in accordance with the present invention is illustrated. An Insert 1 function of the present invention permits a user of the computer editing system to insert material contained on a source block into the sequence of source blocks on the timeline much like creating a splice on motion picture film. The Insert 1 function of the present invention inserts a new source block onto the timeline 210 without erasing or overlaying any of the existing source blocks. For purposes of explanation, a portion of a timeline containing three source blocks designated A, B and C are illustrated in FIG. 3a. In order to execute the Insert 1 function, the user of the computer editing system places the timeline cursor 212 in a position for which the insertion is desired. For the example shown in FIGS. 3a-e, the timeline cursor 212 resides in the center of the source block B.

Figure 3B:
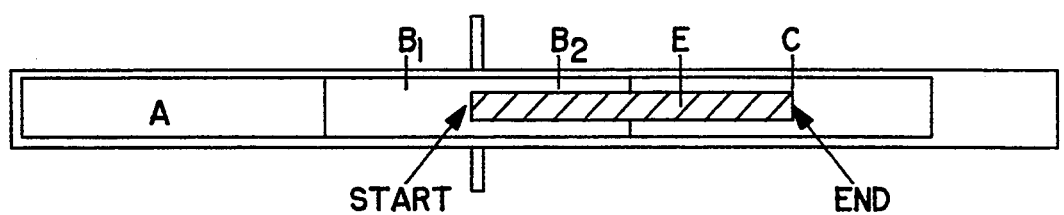
Figure 3C:
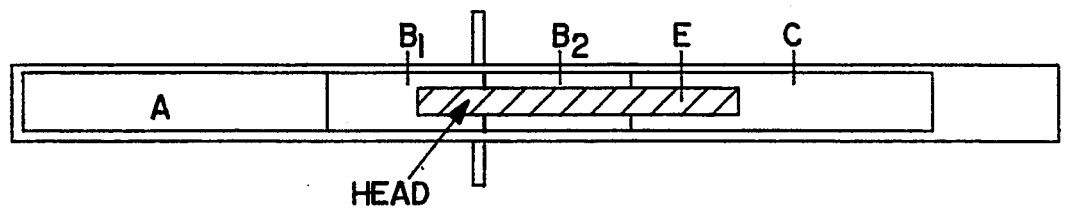

Upon selection, new source material, designated as source block E on FIG. 3b, is placed on the timeline 200 by the computer editing system such that the start of the source block E is adjacent to the timeline cursor 212. The selection of new source material for placement on the timeline 200 may be accomplished through any means without deviating from the spirit and scope of the invention. The Insert 1 function is then initiated by the user through the graphical user interface 200 by placing the selection cursor 201 over the Insert 1 function select 217 and depressing a key on the cursor control device 52. Upon selecting the Insert 1 function, the user selects a head point on the source block E to mark the beginning of the source material for which insert on the timeline 210 is desired. To designate a head point on the source block E, the user selects the right arrow function 234 on the graphical user interface 200. In response, the source block E is advanced in a right to left direction. For the example illustrated in FIGS. 3a-e, the source block E is advanced to a head point designated "Head". In a preferred embodiment, the head point is selected via the head selection control 232, whereupon the computer editing system indicates selection of the head point as shown in FIG. 3c. In a second embodiment, the user selects the head point for the source block E prior to the selection of the Insert 1 function. In the second embodiment for the example illustrated in FIGS. 3a-e, upon selecting the head point and then the Insert 1 function, the computer editing system displays the arrangement shown in FIG. 3c.

Figure 3D:
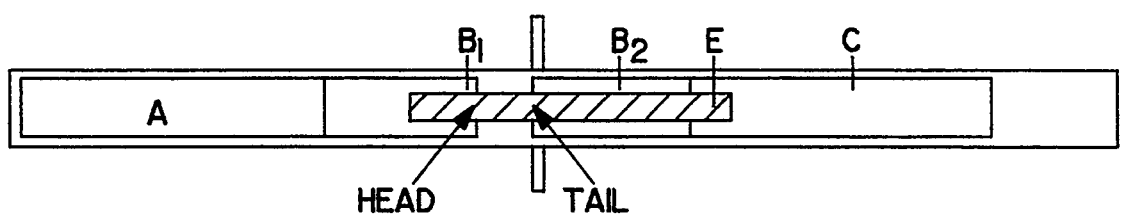
Figure 3E:
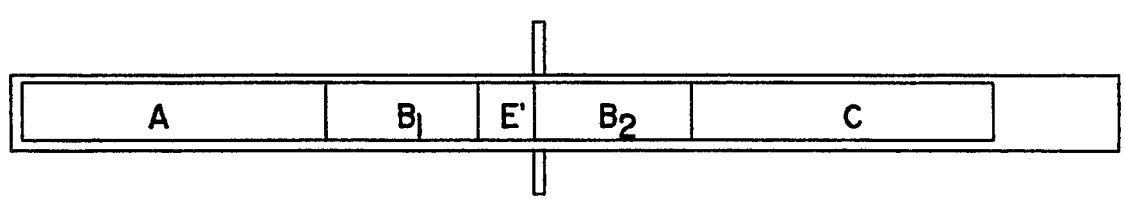

After the head point for the source block E is selected, the user advances the source block E for selection of a tail point. For the example shown in FIGS. 3a-e, the source block E is advanced via the right arrow 234 to place the desired tail point location within the timeline cursor 212. As shown in FIG. 3d, as the source block E is advanced, a separation is created between the original B1 and B2 source blocks. As the separation is created, the head point on the source block E remains adjacent to the tail point of source block B1. The source block E is advanced through the timeline cursor 212 until the desired tail point is reached. The section between the head point and the tail point on the source block E represents the portion of the source block E desired for insertion on the timeline 210. After selection of the tail point on the source block E, the user selects the Insert End 219 on the graphical user interface 200. Upon selecting the Insert End 219, the computer editing system of the present invention inserts the source material contained on the source block E between the head and tail points as shown in FIG. 3e. The portion of the new source material inserted is designated E' to represent that a portion of the source block E is inserted. After the re-edit Insert 1 function in the present example is executed, the source block A is shifted on the timeline 210, in a reverse direction, a distance equal to the source material E'. Likewise, the source block B1, bifurcated from the insertion, is shifted in a reverse direction on the timeline 210 a distance E'.

Figure 4A:
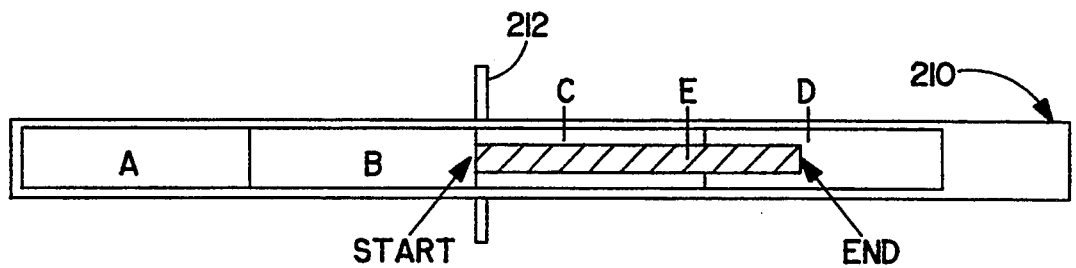
FIGS. 4a–e illustrate a graphical user interface for an overlay re-edit function configured in accordance with the present invention.
Figure 4B:
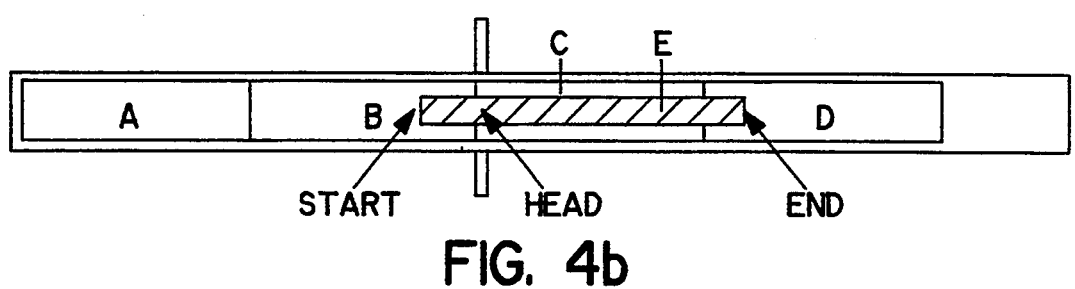

Referring to FIGS. 4a-e, a graphical user interface for an overlay re-edit function configured in accordance with the present invention is illustrated. The computer editing system of the present invention permits overlaying of selected source material onto existing source material via an Insert 2 function. The Insert 2 function, like the Insert 1 function, permits insertion of new source material onto existing source material on the timeline in a re-edit session. However, the Insert 2 function of the present invention overlays the new source material onto the existing source blocks. For purposes of explanation, the timeline shown in FIG. 4a depicts source blocks A, B, C and D. A new source block, designated as source block E, is placed on the timeline 210 for re-edit. The timeline cursor 212 is placed on the timeline at a point for which insertion of source material is desired. For the example shown in FIGS. 4a-e, the timeline cursor 212 is placed at the tail point of source block B. However, the insertion of the new source material need not occur at a head or tail point, but may occur anywhere on the timeline 210. After placing the cursor and the new source block E on the timeline, the user selects a head point for the source block E. As described above in conjunction with the Insert 1 function, the user selects the right arrow 234 on the graphical user interface 200 to advance the source block E forward in time on the timeline. As shown in FIG. 4b, a head point for the source block E is selected.

Figure 4C:
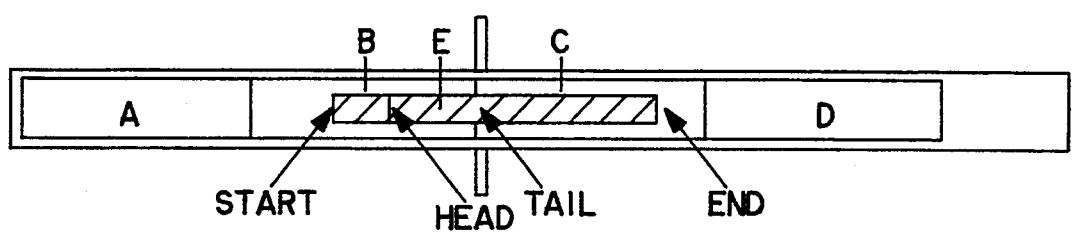
Figure 4D:
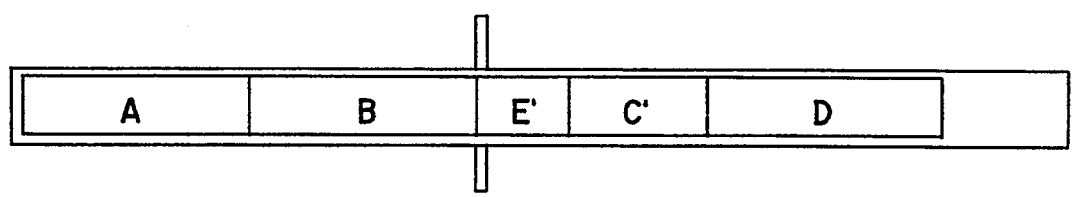
Figure 4E:
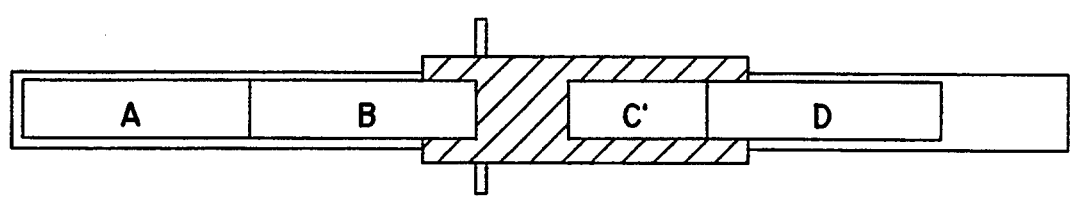

Upon selection of the head point, the source block E is further advanced for selection of a tail point. For the example illustrated in FIGS. 4a-e, the head and tail points for the new source block E are shown in FIG. 4c. After designating the tail point, the user selects the Insert End 219 function on the graphical user interface 200. The computer editing system of the present invention overlays the selected source material between the head point and the tail point from the source block E on top of the source block C. As shown in FIG. 4d, new source material E', representing the portion between the head point and tail the point, is shown. Also, the source block C, now designated C', is shortened as a result of the overlay function. Note for the Insert 2 function of the present invention, because the head and tail points for the new source block E were selected for placement only in source block C, the source blocks A, B and D are not affected, such that the source blocks retain their original position on the timeline. FIG. 4e illustrates the source block E in a Trim 3 mode. The Trim 3 mode permits the user to view all existing source block material from the start to the end of the source block E. The operation of the present invention Trim 3 mode is described more fully below.

Figure 5A:
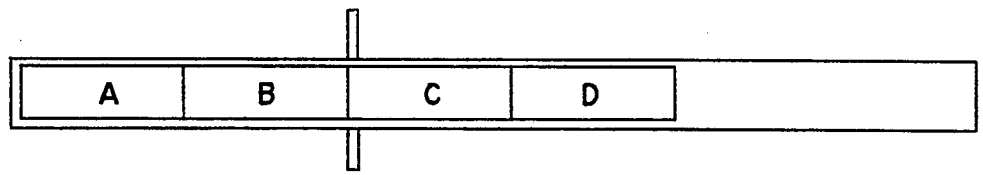
FIGS. 5a–5f illustrate a graphical user interface for a Trim 1 mode re-edit function configured in accordance with the present invention.

Referring to FIGS. 5a–5f, a graphical user interface for a Trim 1 function re-edit function configured in accordance with the present invention is illustrated. The Trim 1 function permits a user of the computer editing system to view and select existing source material in a source block during a re-edit session. Specifically, the Trim 1 function permits a user to edit the head point, tail point, or any combination thereof, for a selected source block. In the Trim 1 mode, if the duration of a source block selected is altered through selection of new head and/or tail points, the other source blocks on the timeline are affected accordingly. For purposes of explanation, four source blocks, designated A, B, C, and D are illustrated in FIG. 5a. To perform a Trim 1 function, the user places the timeline cursor 212 at the head or tail of a source block for which a re-edit is desired. For the example illustrated in FIGS. 5a–f, the timeline cursor 212 is placed at the tail of source block B using the tail select 230 on the graphical user interface 200.

Figure 5B:
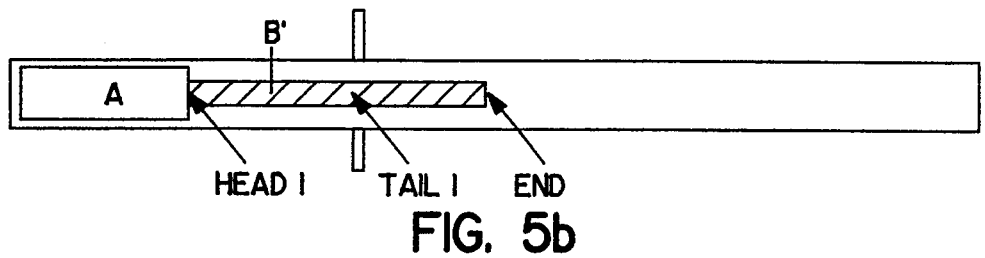
Figure 5C:
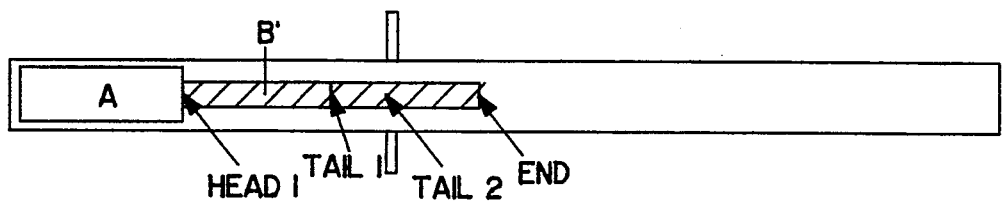

Upon placement of the timeline cursor in a desired head or tail location, the user selects the Trim 1 function from the graphical user interface 200 via the Trim 1 select 227. In addition to selecting the Trim 1 function, the user selects either right view 242 or left view 240 selects. The selection of the right view 242 or the left view 240 is indicated through illumination of the respective border areas on the graphical user interface 200. In a preferred embodiment, the selected right or left view border is illuminated, while the border area for the inactive view is darkened. For the example illustrated in FIGS. 5a–f, if the right view 242 is selected for modification of the tail point, then all existing source material for the source block B is shown beginning at the head$_1$ point and extending to the end point as shown in FIG. 5b. In the right view perspective, the adjacent source block C is not shown on the timeline, and the source block B is displayed in a different color and size than source block A. In the right view perspective, the user is permitted to view all existing source material for the source block B residing right of the cursor thereby allowing the user to select a new tail point. To select a new tail point in the present example, the user, through use of the right arrow 234, advances the source block B in time resulting in the source material moving in a right to left direction. The user advances the source material contained in source block B until the desired tail point is located within the timeline cursor. The selection of a tail point for the present example, designated Tail$_2$, is illustrated in FIG. 5c.

Figure 5D:
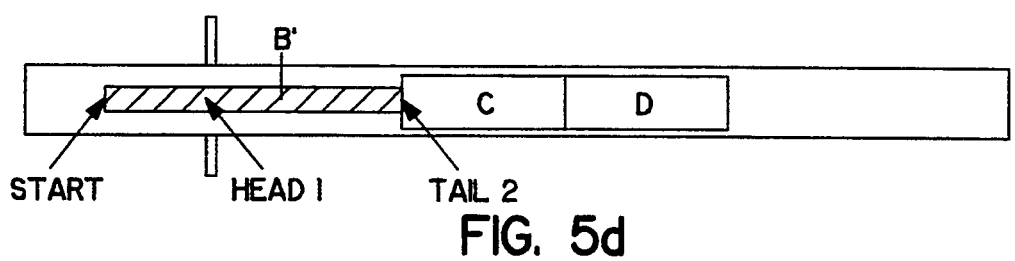
Figure 5E:
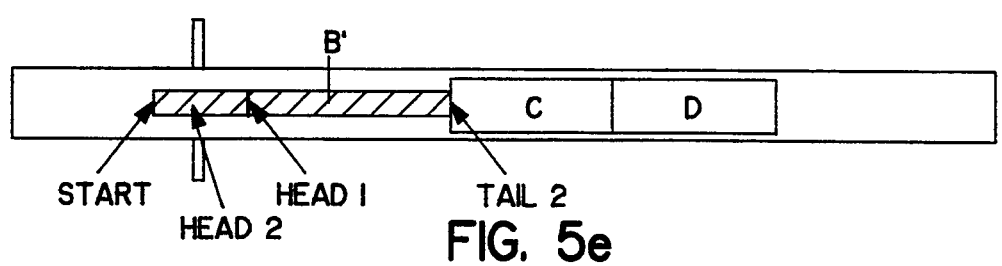

The selected source material comprising the new Tail$_2$ point for the original source block B is designated B'. For the present example, the new Tail$_2$ lies to the right of Tail$_1$, the previous tail point. Therefore, the duration of the source material for B' is greater than the duration source material B. A user may also desire to change the original head point for the source material B. To accomplish this task, the user selects the left view via the left view select 240 on graphical user interface 200. Upon invoking the left view perspective, the computer editing system of the present invention displays the entire available source material in the source block B left of the timeline cursor. As shown in FIG. 5d, the source block B from the start point to the tail point is displayed. To select a new head point, the user, through the graphical user interface 200, moves the source material in a reverse direction in relation to the timeline as shown in FIG. 5e. The user shifts the source material in source block B such that the desired head point is located within the timeline cursor.

Figure 5F:
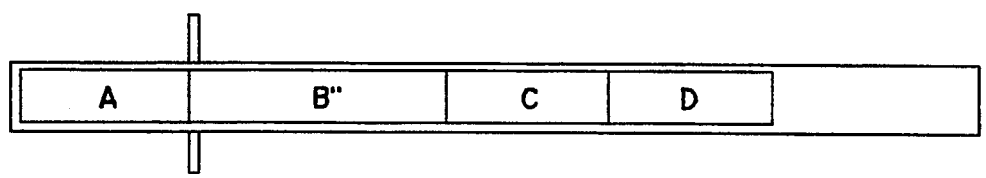

When the desired head point is within the timeline cursor, the user selects the head point. The current source material containing the new head point and tail point is designated as B''. The current source material B'' comprises a different duration length than the original source material B. When the user has completed the re-edit session, the user selects the Trim End function 223 on the graphical user interface 200. The computer editing system of the present invention then displays the new current source material B'' as re-edited. As shown in FIG. 5f, the change in duration of the current source material B'' results in a shift of source blocks A, C and D on the timeline.

Figure 6A:
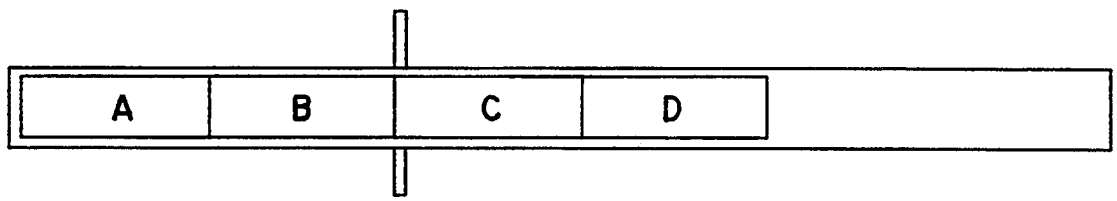
FIGS. 6a–d illustrate a graphical user interface for a Trim 2 function configured in accordance with the present invention.
Figure 6B:
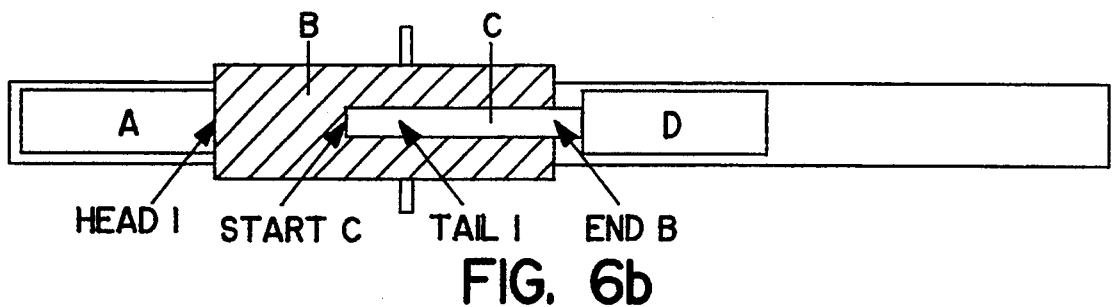

Referring to FIGS. 6a–d, a graphical user interface for a Trim 2 function configured in accordance with the present invention is illustrated. The Trim 2 function of the present invention permits a user to perform re-edit operations on existing source block material. In contrast to the Trim 1 function, the Trim 2 function does not displace in time unedited source blocks on the timeline. FIG. 6a depicts four source blocks A, B, C and D on a timeline. The user positions the timeline cursor between two source blocks for which the re-edit is desired. For the example shown in FIGS. 6a–d, re-edits of the tail point of source block B and the head point of source block C are desired. As shown in FIG. 6b, the source material for the end of source block B and start of source block C extends beyond the original edit illustrated in FIG. 6a. In order to perform the re-edit, the user selects the Trim 2 select 225 on the graphical user interface 200.

Figure 6C:
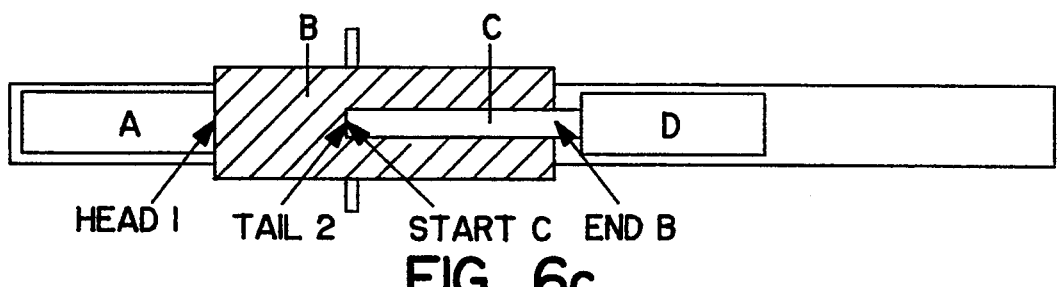
Figure 6D:
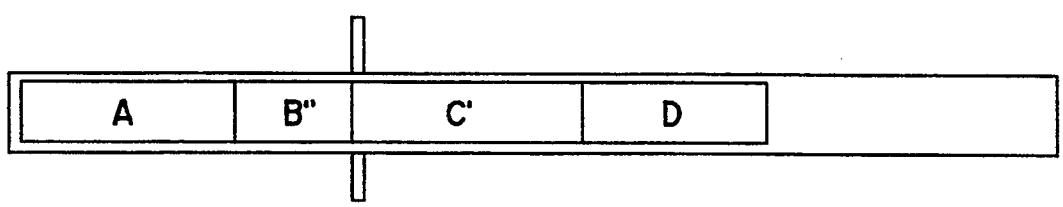

After invoking the Trim 2 function, the user selects either the right arrow 234 or left arrow 236 to perform the re-edit. For the example shown in FIGS. 6a–d, the user selects the left arrow 236 causing the source block B to extend along the timeline in a reverse direction. As shown in FIG. 6c, the source block B comprises a new tail point, and the source block C comprises a new head point. Therefore, using the Trim 2 function of the present invention, the user may adjust the head point of source block C and the tail point of source block B in accordance with the positioning of the timeline cursor. After the user positions the cursor to select the new head point for source block C and tail point for source block B, the user selects the Trim End 232 select on the graphical user interface 200. The computer editing system of the present invention then displays the new re-edit timeline as shown in FIG. 6d. The source block B, comprising a new tail point, is designated as B', and the source block C, comprising a new head point, is designated as C'. In contrast to the Trim 1 function, the Trim 2 function retains synchronization for adjacent source blocks on the timeline. For the example shown in FIGS. 6a–d, the source blocks A and D remain unchanged in both duration and positioning on the timeline. In order to affect the positioning of adjacent source blocks, Trim 1 mode is used.

Figure 7A:
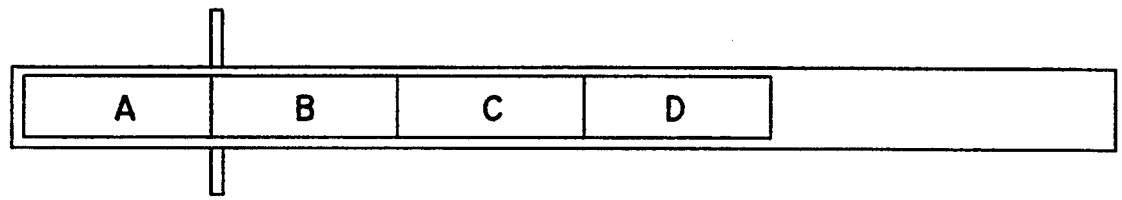
FIGS. 7a–d illustrate a graphical user interface for a Trim 3 function configured in accordance with the present invention.
Figure 7B:
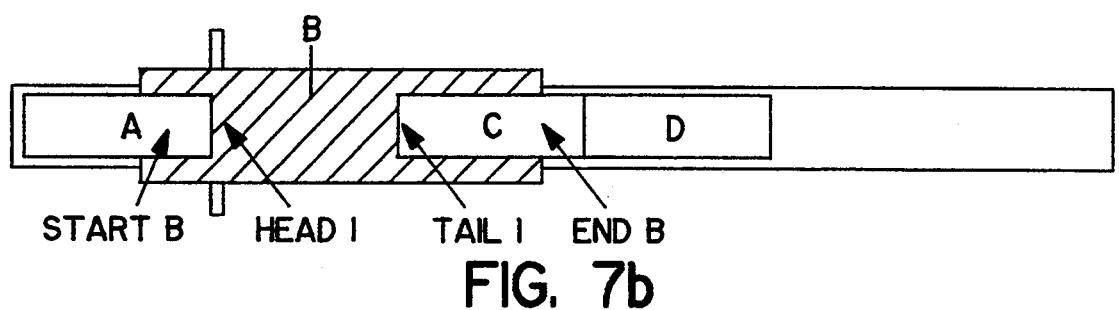
Figure 7C:
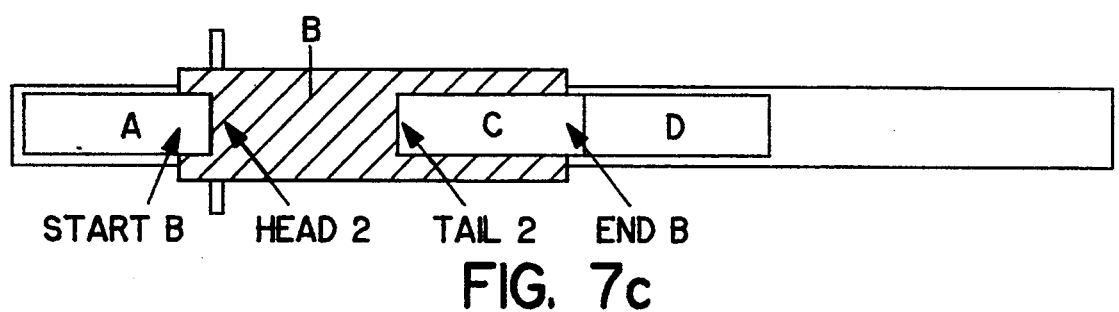
Figure 7D:
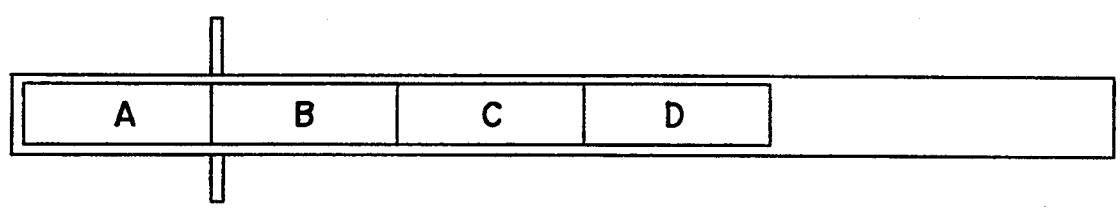

Referring to FIGS. 7a–d, a graphical user interface for a Trim 3 mode configured in accordance with the present invention is illustrated. The Trim 3 mode permits re-editing of a single source block. An example timeline is illustrated in FIG. 7a containing source blocks A, B, C and D. To perform a re-edit in the Trim 3 mode, the user places the timeline cursor at the head or tail of the source block for which re-editing is desired, and selects the Trim 3 select 221 on the graphical user interface 200. For the example illustrated in FIGS. 7a-d, the source block B is chosen for re-edit. The Trim 3 mode permits the user to change both the head and tail points, simultaneously. The selection of new head and tail points in conjunction with the trim 3 function of the present invention is accomplished through explicitly selecting either a new head or tail point at the timeline cursor resulting in the computer editing system selecting a corresponding new tail or head point. For the example of FIGS. 7a-d, placement of the timeline cursor at the head point is illustrated. In order to change the head and tail points on the source block B, the user scrolls through the source block B with the use of the right arrow or left arrow selects 234 and 236 respectively.

For the example of FIGS. 7a-d, the user, via the left arrow select 236 on the graphical user interface 200, moves the source block B in a reverse direction. When the new head point desired is placed underneath the timeline cursor, the user selects the Trim End select 223 on the graphical user interface 200. Upon invocation of the Trim End function, the computer editing system of the present invention displays the new source block B with the new head and tail points. The selection of a new head point, as shown in FIGS. 7a-d, results in automatic selection of a corresponding tail point by the computer editing system. Alternatively, selection of a new tail point results in automatic selection of a corresponding head point by the computer editing system. The Trim 3 function of the present invention does not displace the position of adjacent source blocks on the timeline. For the example shown in FIGS. 7a-d, the source blocks A, C and D retain the same position and duration on the timeline.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. In a computer controlled editing system for editing a multi-media production including a central processing unit (CPU) coupled to a display device and storage means coupled to said CPU, a method for displaying available source material for editing comprising the steps of:

storing a plurality of source logs comprising a start point and an end point identifying all available source material for editing by said computer controlled editing system;

displaying, on said display device, at least one sequence of a plurality of source material blocks on a timeline such that a tail point of a first source material block is adjacent to a head point of a subsequent source material block on said timeline, said head and tail points for each source material block displayed defining up to all of said available source material identified by a corresponding source log;

providing a means to select a source material block for re-editing including providing a means to indicate a point on said selected source material block for which re-edit is desired;

selecting a re-edit function; and displaying, on said display device upon selection of said re-edit function, available source material required for said re-edit function selected and corresponding to said selected source material block and said point indicated by distinguishing said available source material from said source material blocks on said timeline by size, color and relative layering.

2. The method for displaying available source material for editing as claimed in claim 1 wherein the step of displaying at least one sequence of a plurality of source material blocks on a timeline comprises the step of displaying a plurality of sequences of source material blocks showing time interrelationships, each of said plurality of sequences of source material blocks representing one track for a multi-track production.

3. The method for displaying available source material for editing as claimed in claim 1 wherein the step of providing a means to indicate a point on said source material block comprises the step of providing a timeline cursor extending through said source material blocks on said timeline.

4. The method of displaying available source material for editing as claimed in claim 1 wherein the step of selecting a re-edit function comprises the step of selecting an insert "1" function, wherein said insert "1" function permits insertion of new source material at said point indicated.

5. The method for displaying available source material for editing as claimed in claim 4 further comprising the steps of:

displaying new source material, starting at said point indicated, for which insertion is desired by distinguishing said new source material from said source material blocks displayed on said timeline by size, color and relative layering;

advancing said new source material along said timeline;

selecting a head point on said new source material when said head point desired is within said point indicated;

advancing said source material along said timeline while displaying said selected source material block at said point indicated separation from a subsequent source material block on said timeline;

selecting a tail point on said new source material when said tail point desired is within said point indicated;

terminating said insert "1" function; and displaying said new source material, from said head point to said tail point, on said timeline starting at said point indicated such that said plurality of source material blocks are displayed in a continuous sequence.

6. The method for displaying available source material for editing as claimed in claim 1 wherein the step of selecting a re-edit function comprises the step of selecting an insert "2" function, wherein said insert "2" function permits overlay of new source material onto existing source material block.

7. The method for displaying available source material for editing as claimed in claim 6 further comprising the steps of:

displaying new source material, starting at said point indicated, for which overlay is desired by distinguishing said new source material from said source material blocks displayed on said timeline by size, color and relative layering;

advancing said new source material along said timeline;

selecting a head point on said new source material when said head point desired is within said point indicated;

selecting a tail point on said new source material when said tail point desired is within said point indicated;

terminating said insert "2" function; and displaying said new source material upon termination, from said head point to said tail point, on said timeline starting at said point indicated so as to overlay said existing source material blocks on said timeline.

8. The method for displaying available source material for editing as claimed in claim 1 wherein the step of selecting a re-edit function comprises the step of selecting a trim "1" function, wherein said trim '1' function permits selection of a new tail and head point for an existing source material block so as to alter positions of source material blocks adjacent to said existing source material block displayed on said timeline.

9. The method for displaying available source material for editing as claimed in claim 8 further comprising the steps of:

selecting a right and a left view for said selected source material block;

displaying, in response to selection of said left view, available source material for said selected source material block residing left of said point indicated by distinguishing said selected source material block from said source material blocks displayed on said timeline by size, color and relative layering;

advancing said selected source material block along said timeline;

selecting a tail point on said source material block selected when said tail point desired is within said point indicated and said left view is selected;

displaying, in response to selection of said right view, available source material for said selected source material block residing right of said point indicated by distinguishing said selected source material block from said source material blocks displayed on said timeline by size, color and relative layering;

selecting a head point on said selected source material when said head point desired is within said point indicated and said right view is selected;

terminating said trim "1" function; and displaying said new source material upon termination, from said head point to said tail point, on said timeline so as to alter positions of said adjacent source material blocks displayed on said timeline.

10. The method for displaying available source material for editing as claimed in claim 1 wherein the step of selecting a re-edit function comprises the step of selecting a trim "2" function, wherein said trim "2" function permits exchanging additional source material for said selected source material block such that exchanging said additional source material in said selected source material adjusts source material in a second existing source material block.

11. The method for displaying available source material for editing as claimed in claim 10 further comprising the steps of:

displaying available source material for said selected source material block by distinguishing said selected source material block and said second existing source material block from said source material blocks displayed on said timeline by size, color and relative layering;

advancing said selected source material block along said timeline so as to change relative positioning of said second existing source block;

selecting changing source material on said selected source material block when a tail or head point desired is within said point indicated;

terminating said trim "2" function; and displaying said source material block selected and said second existing source material block on said timeline reflecting selection of a new head or tail point on said selected source material block and said second existing source block.

12. The method for displaying available source material for editing as claimed in claim 1 wherein the step of selecting a re-edit function comprises the step of selecting a trim "3" function, wherein said trim "3" function permits selection of a new tail and head point simultaneously for said source material block selected.

13. The method for displaying available source material for editing as claimed in claim 12 further comprising the steps of:

displaying available source material for said selected source material block by distinguishing said selected source material block from said source material blocks displayed on said timeline by size, color and relative layering;

advancing said selected source material block along said timeline in a forward and reverse directions;

selecting a head/tail point on said selected source material block when said head/tail point desired is within said point indicated;

terminating said trim "3" function; and displaying said selected source material block on said timeline reflecting selection of said head/tail point on said source material block selected.

14. In a computer controlled editing system for editing a multi-media production including a central processing unit (CPU) coupled to a display device, an apparatus for displaying available source material for editing comprising:

storage means coupled to said CPU for storing a plurality of source logs comprising a start point and an end point identifying all available source material for editing by said computer controlled editing system;

graphical user interface (GUI) means coupled to said CPU, storage means and said display device for providing a man to machine interface for said computer controlled editing system, said GUI means comprising a timeline and a plurality of source material blocks each having a head point and a tail point, said head and tail points for each source material block defining up to all of said available source material identified by a corresponding source log, said GUI means comprising;

selection means for selecting a source material block for re-editing including providing a means to indicate a point on said source material block selected for which re-edit is desired, said selection means providing a means for selecting a re-edit function, and display means for displaying, on said display device, at least one sequence of a plurality of source material blocks on said timeline such that a tail point of a first source material block is adjacent to a head point of a subsequent source material block on said timeline, said display means displaying, on said display device upon selection of said re-edit function, available source material required for said re-edit function selected and corresponding to said selected source material block and said point indicated by distinguishing and available source material from said source material blocks displayed on said timeline by size, color and relative layering.

15. The apparatus for displaying available source material for editing as claimed in claim 14 wherein said graphical user interface means comprises a plurality of sequences of source material blocks showing time interrelationships, each of said plurality of sequences of source material blocks representing one track for a multi-track production.

16. The apparatus for displaying available source material for editing as claimed in claim 14 wherein said selection means comprises a timeline cursor extending through said source material blocks on said timeline.

17. The apparatus for displaying available source material for editing as claimed in claim 14 wherein said means for selecting a re-edit function comprises means for selecting an insert "1" function, wherein said insert "1" function permits insertion of new source material at said point indicated.

18. The apparatus for displaying available source material for editing as claimed in claim 17 further comprising:
- means for displaying new source material, starting at said point indicated, for which insertion is desired by distinguishing said new source material from said source material blocks displayed on said timeline by size, color and relative layering;
- means for advancing said source material along said timeline;
- means for selecting a head point on said new source material when said head point desired is within said point indicated;
- means for advancing said source material along said timeline while displaying said selected source material block at said point indicated separation from a subsequent source material block on said timeline;
- means for selecting a tail point on said new source material when said tail point desired is within said point indicated;
- means for terminating said insert "1" function; and
- means for displaying said new source material, from said head point to said tail point, on said timeline starting at said point indicated such that said plurality of source material blocks are displayed in a continuous sequence.

19. The apparatus for displaying available source material for editing as claimed in claim 14 wherein said means for selecting a re-edit function comprises means for selecting an insert "2" function, wherein said insert "2" function permits overlay of new source material onto an existing source material block.

20. The apparatus for displaying available source material for editing as claimed in claim 19 further comprising:
- means displaying new source material, starting at said point indicated, for which overlay is desired by distinguishing said new source material from said source material blocks displayed on said timeline by size, color and relative layering;
- means for advancing said new source material along said timeline;
- means for selecting a head point on said new source material when said head point desired is within said point indicated;
- means for selecting a tail point on said new source material when said tail point desired is within said point indicated;
- means for terminating said insert "2" function; and
- means for displaying said new source material upon termination, from said head point to said tail point, on said timeline starting at said point indicated so as to overlay said existing source material blocks on said timeline.

21. The apparatus for displaying available source material for editing as claimed in claim 14 wherein said means for selecting a re-edit function comprises means for selecting an a trim "1" function, wherein said trim "1" function permits selection of a new tail and head point for an existing source material block so as to alter positions of said adjacent source material blocks on said timeline.

22. The apparatus for displaying available source material for editing as claimed in claim 21 further comprising:
- means for selecting a right and a left view for said selected source material block;
- means for displaying, in response to selection of said left view, available source material for said selected source material block residing left of said point indicated by distinguishing said selected source material block from said source material blocks displayed on said timeline by size, color and relative layering;
- means for advancing said selected source material block along said timeline;
- means for selecting a tail point on said selected source material block when said tail point desired is within said point indicated and said left view is selected;
- means for displaying, in response to selection of said right view, available source material for said selected source material block residing right of said point indicated by distinguishing said selected source material block from said source material blocks displayed on said timeline by size, color and relative layering;
- means for selecting a head point on said selected source material when said head point desired is within said point indicated and said right view is selected;
- means for terminating said trim "1" function; and
- means for displaying said selected source material block upon termination of said trim "1" function, from said head point to said tail point, on said timeline so as to alter positions of source material blocks adjacent to said new source material displayed on said timeline.

23. The apparatus for displaying available source material for editing as claimed in claim 14 wherein said means for selecting a re-edit function comprises means for selecting a trim "2" function, wherein said trim "2" function permits changing source material for said selected source material block such that changing source material in said selected source material block adjusts source material in a second existing source material block.

24. The apparatus for displaying available source material for editing as claimed in claim 23 further comprising:

means for displaying available source material for said selected source material block by distinguishing said selected source material block and said second existing source material block from said source material blocks displayed on said timeline by size, color and relative layering;

means for advancing said selected source material block along said timeline so as to change relative positioning of said second existing source block;

means for selecting changing source material on said selected source material block when a tail or head point desired is within said point indicated;

means for terminating said trim "2" function; and means for displaying said selected source material block and said second existing source material block on said timeline reflecting selection of a new head or tail point on said selected source material block and said second existing source block.

25. The apparatus for displaying available source material for editing as claimed in claim 14 wherein said means for selecting a re-edit function comprises means for selecting a trim "3" function, wherein said trim "3" function permits selection of a new tail and head point simultaneously for said selected source material block.

26. The apparatus for displaying available source material for editing as claimed in claim 25 further comprising:

means for displaying available source material for said selected source material block by distinguishing said selected source material block from said source material blocks displayed on said timeline by size, color and relative layering;

means for advancing said selected source material block along said timeline in a forward and reverse directions;

means for selecting a head/tail point on said selected source material block when said head/tail point desired is within said point indicated;

means for terminating said trim "3" function; and means for displaying said selected source material block on said timeline reflecting selection of said head/tail point on said selected source material block.

* * * * *